US012756786B2

(12) United States Patent
Takahashi

(10) Patent No.: US 12,756,786 B2
(45) Date of Patent: Oct. 6, 2026

(54) INFORMATION PROCESSING SYSTEM, NON-TRANSITORY COMPUTER READABLE MEDIUM STORING INFORMATION PROCESSING PROGRAM, AND INFORMATION PROCESSING METHOD

(71) Applicant: FUJIFILM BUSINESS INNOVATION CORP., Tokyo (JP)

(72) Inventor: Satoshi Takahashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/449,791

(22) Filed: Aug. 15, 2023

(65) Prior Publication Data

US 2024/0305731 A1 Sep. 12, 2024

(30) Foreign Application Priority Data

Mar. 6, 2023 (JP) ................................ 2023-034124

(51) Int. Cl.
*H04N 1/00* (2006.01)

(52) U.S. Cl.
CPC ....... *H04N 1/0097* (2013.01); *H04N 1/00037* (2013.01); *H04N 1/00411* (2013.01); *H04N 1/00663* (2013.01); *H04N 2201/0094* (2013.01)

(58) Field of Classification Search
None
See application file for complete search history.

(56) References Cited

U.S. PATENT DOCUMENTS

2017/0149990 A1* 5/2017 Saito .................. H04N 1/00411
2021/0326079 A1* 10/2021 Hirobe ............... H04N 1/00517
2024/0305731 A1* 9/2024 Takahashi .......... H04N 1/00411

FOREIGN PATENT DOCUMENTS

JP 2020-027660 A 2/2020
JP 6911082 B2 7/2021

* cited by examiner

*Primary Examiner* — Darryl V Dottin
(74) *Attorney, Agent, or Firm* — Oliff PLC

(57) ABSTRACT

The information processing system includes at least one processor, in which the processor is configured to: acquire a recording instruction to record a series of sequences for automatically executing plural input operations, which are performed by a user, for processing of a target to be processed; and then record input operation information, which is given by the user to an information processing apparatus, and sensing information, which is obtained by a sensor that senses information about arrangement of the target to be processed, in the series of sequences capable of execution in a chronological order.

11 Claims, 8 Drawing Sheets

FIG. 8A

INPUT OPERATION CORRESPONDENCE DATABASE 13C

| DISPLAY TEXT STRING | UPPER LEFT COORDINATES | SIZE |
|---|---|---|
| START | (190.130) | (66.20) |
| RESET | (205.0) | (50.18) |
| ... | ... | ... |

FIG. 8B

SIMILARITY DATABASE 13D

| DISPLAY TEXT STRING | COMPARATIVE TEXT STRING | SIMILARITY |
|---|---|---|
| START | START | 100 |
| | INITIATION | 85 |
| | EXECUTION | 80 |
| | ... | ... |
| | STOP | 0 |

INFORMATION PROCESSING SYSTEM, NON-TRANSITORY COMPUTER READABLE MEDIUM STORING INFORMATION PROCESSING PROGRAM, AND INFORMATION PROCESSING METHOD

CROSS-REFERENCE TO RELATED APPLICATIONS

This application is based on and claims priority under 35 USC 119 from Japanese Patent Application No. 2023-034124 filed Mar. 6, 2023.

BACKGROUND

(i) Technical Field

The present invention relates to an information processing system, a non-transitory computer readable medium storing an information processing program, and an information processing method.

(ii) Related Art

JP2020-27660A discloses a method of generating a script for testing a mobile terminal on which an application program to be tested is installed, as a script generation method in which a creation program installed in the mobile terminal generates a script on the basis of operation information given by a user in a case where the user performs an input operation.

SUMMARY

Aspects of non-limiting embodiments of the present disclosure relate to an information processing apparatus that is capable of suppressing execution of a series of sequences before arrangement of a target to be processed, as compared with a case where only operation information given by a user is recorded as a series of sequences.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system includes at least one processor, in which the processor is configured to: acquire a recording instruction to record a series of sequences for automatically executing a plurality of input operations, which are performed by a user, for processing of a target to be processed; and then record input operation information, which is given by the user to an information processing apparatus, and sensing information, which is obtained by a sensor that senses information about arrangement of the target to be processed, in the series of sequences capable of execution in a chronological order.

BRIEF DESCRIPTION OF THE DRAWINGS

Exemplary embodiment(s) of the present invention will be described in detail based on the following figures, wherein:

FIG. 8A is a diagram showing an example of an input operation correspondence database according to the exemplary embodiment; and FIG. 8B is a diagram showing an example of a similarity database according to the exemplary embodiment.

DETAILED DESCRIPTION

Figure 1:
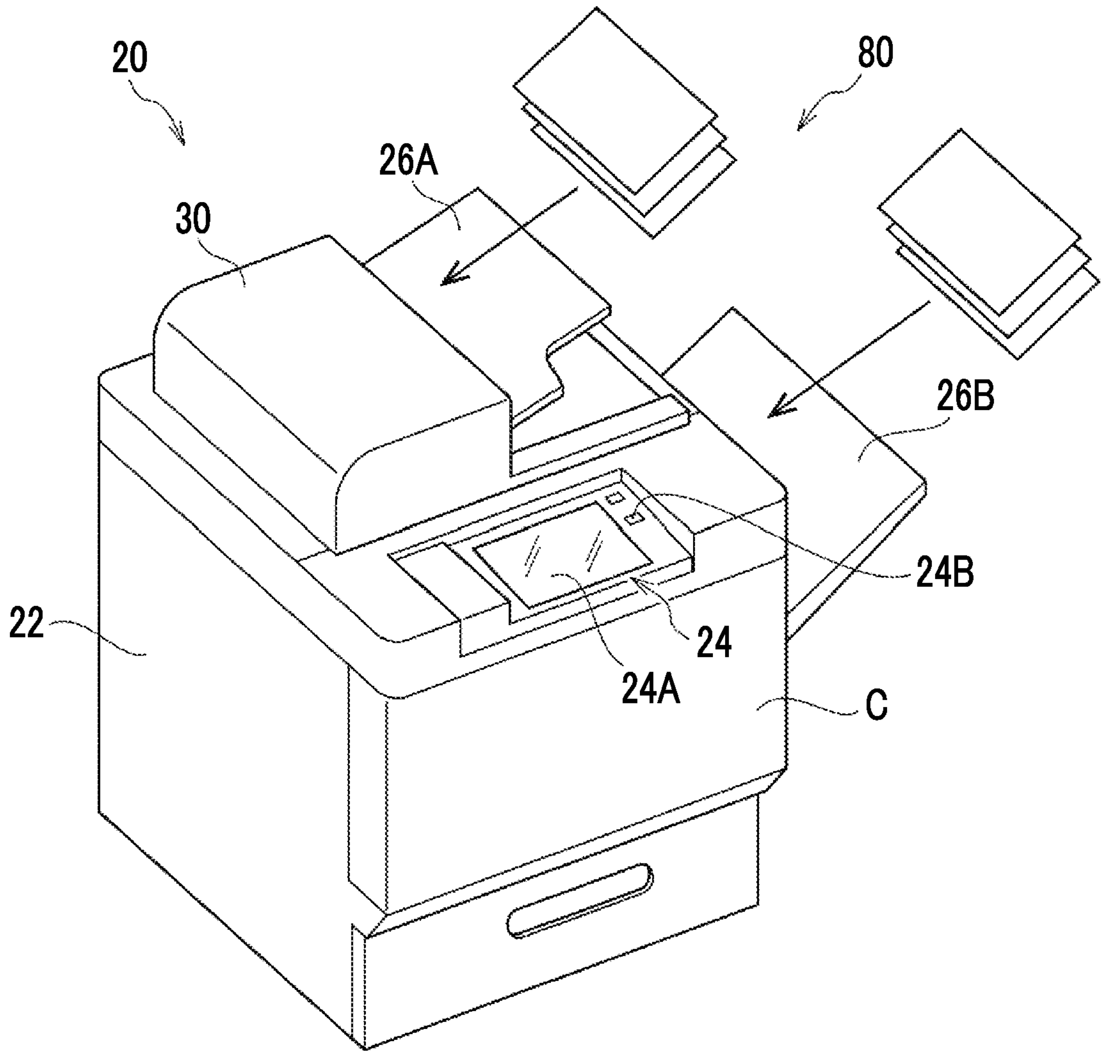
FIG. 1 is a perspective view showing an example of a configuration of an overview of an image forming apparatus in an information processing system according to an exemplary embodiment.

Hereinafter, an information processing system and an information processing program according to an exemplary embodiment of the present disclosure will be described, with reference to the drawings. Components indicated by the identical reference numeral in each drawing means the identical components. However, unless otherwise specified in the specification, the number of each component is not limited to one, and a plurality of each component may be present.

Further, description of repeated configurations and reference numerals in the respective drawings may be omitted. The present disclosure is not limited to the following exemplary embodiments, and can be implemented with appropriate modifications such as omission of configurations, replacement with different configurations, use in combination with one exemplary embodiment and various modification examples, and the like, without departing from the scope of the aspects of the present disclosure.

Information Processing System

An information processing system 80 shown in FIGS. 1 to 4 is a system constructed in an image forming apparatus 20. The image forming apparatus 20 is an example of the information processing apparatus according to the exemplary embodiment of the present disclosure. The term "system" in the exemplary embodiment of the present disclosure includes any of a system configured by a plurality of devices, a system configured by a single device, and a system constructed in a higher-level device or system. That is, the information processing system according to the exemplary embodiment of the present disclosure may be constructed over a plurality of apparatuses other than the image forming apparatus 20. For example, the information processing system may be constructed in the image forming apparatus 20 and an external feeding device or the like externally attached to the image forming apparatus 20. Further, the information processing apparatus according to the exemplary embodiment of the present disclosure may be realized by an apparatus other than the image forming apparatus 20.

Overview of Image Forming Apparatus

The image forming apparatus 20 according to the present exemplary embodiment receives a job which is input by a user's input operation and executes a designated job. An example of the job executed by the image forming apparatus 20 is a printing job of forming an original document image generated from a read original document or the like on a recording medium such as a sheet.

The image forming apparatus 20 includes a body part 22, an input part 24, and sheet trays 26A, 26B, 26C, and 26D. Further, the image forming apparatus 20 includes a control device 10 (refer to FIG. 3).

Body Part

Figure 3:
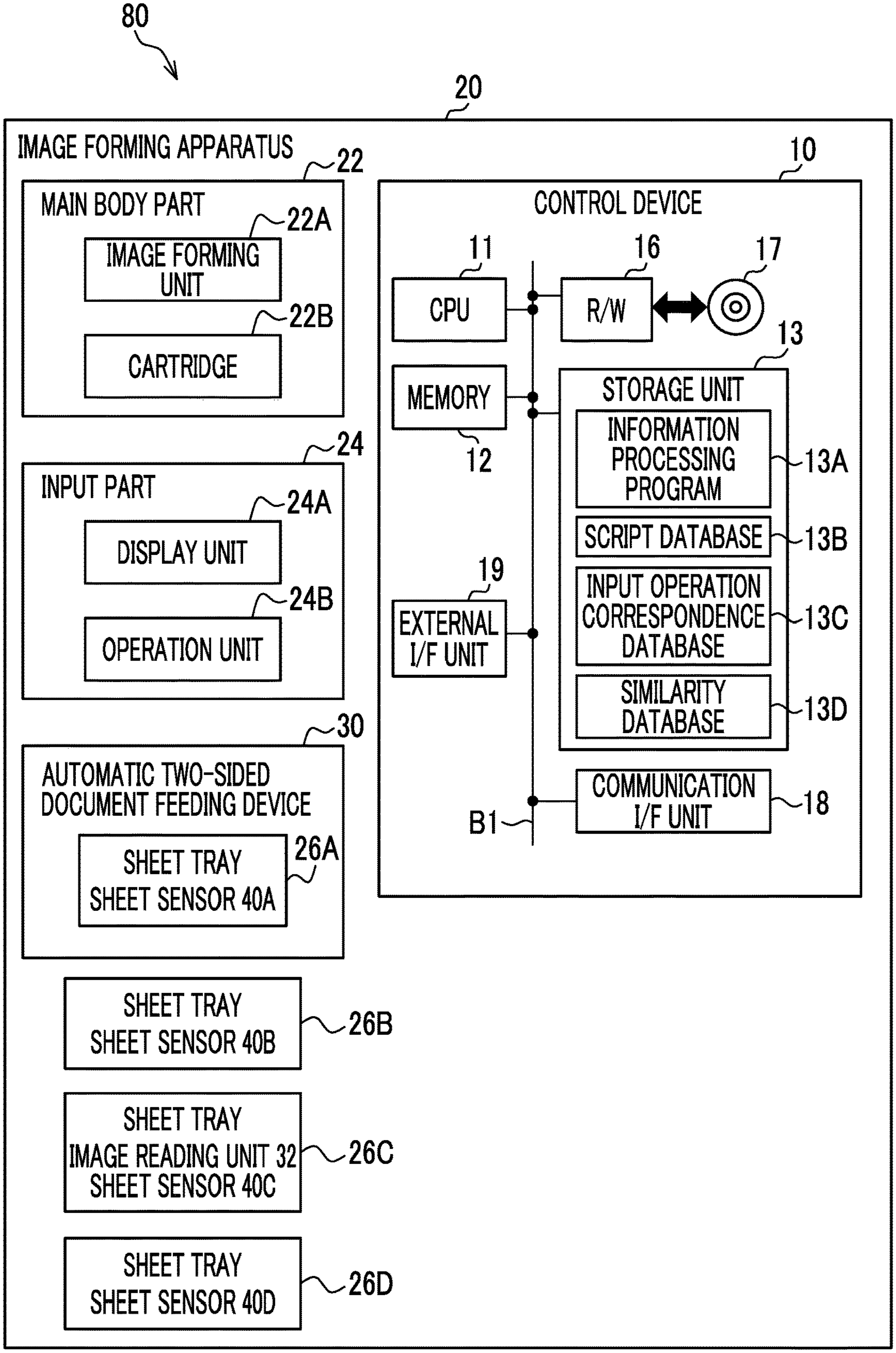
FIG. 3 is a block diagram showing an example of an electrical configuration of an image forming apparatus according to the exemplary embodiment.

The body part 22 is a housing in which an image forming unit 22A, a cartridge 22B, and the like shown in FIG. 3 are housed. Further, the control device 10 is also housed in the body part 22.

The image forming unit 22A forms an original document image, which is generated by an image reading unit 32 to be described later, on a recording medium such as sheet by using, for example, an electrophotographic method or an inkjet recording method.

In a case where the image forming unit 22A employs the electrophotographic method, the cartridge 22B is a toner cartridge containing toner as an example of a color material. Further, in a case where the image forming unit 22A employs the inkjet recording method, the cartridge 22B is an ink cartridge containing ink as an example of a color material.

The cartridge 22B includes cartridges of color materials such as yellow, magenta, cyan, and black. A user is able to replenish an insufficient color material by opening a front cover C of the body part 22 shown in FIG. 1 and replacing each cartridge.

Input Part

The input part 24 is an interface through which a user is able to input and operate a job to be executed by the image forming apparatus 20 by the user, and includes a display unit 24A and an operation unit 24B.

The display unit 24A is configured by combining, for example, a touch panel with a liquid crystal display, an organic EL display, or the like. An image or the like is displayed on the display unit 24A, in response to a user's touch operation, processing performed by the image forming apparatus 20, or the like. The operation unit 24B is an operation key, an operation button, a power button, and the like which are provided in the image forming apparatus 20.

A user may designate a job to the image forming apparatus 20 or issue an instruction of initiation of a job by the touch operation on the display unit 24A, pressing down an operation button to the operation unit 24B, or the like. It should be noted that, in the following description, "the user's input operation via the display unit 24A" will be described, but the user's input operation may be performed via the operation unit 24B.

Sheet Tray

Figure 2:
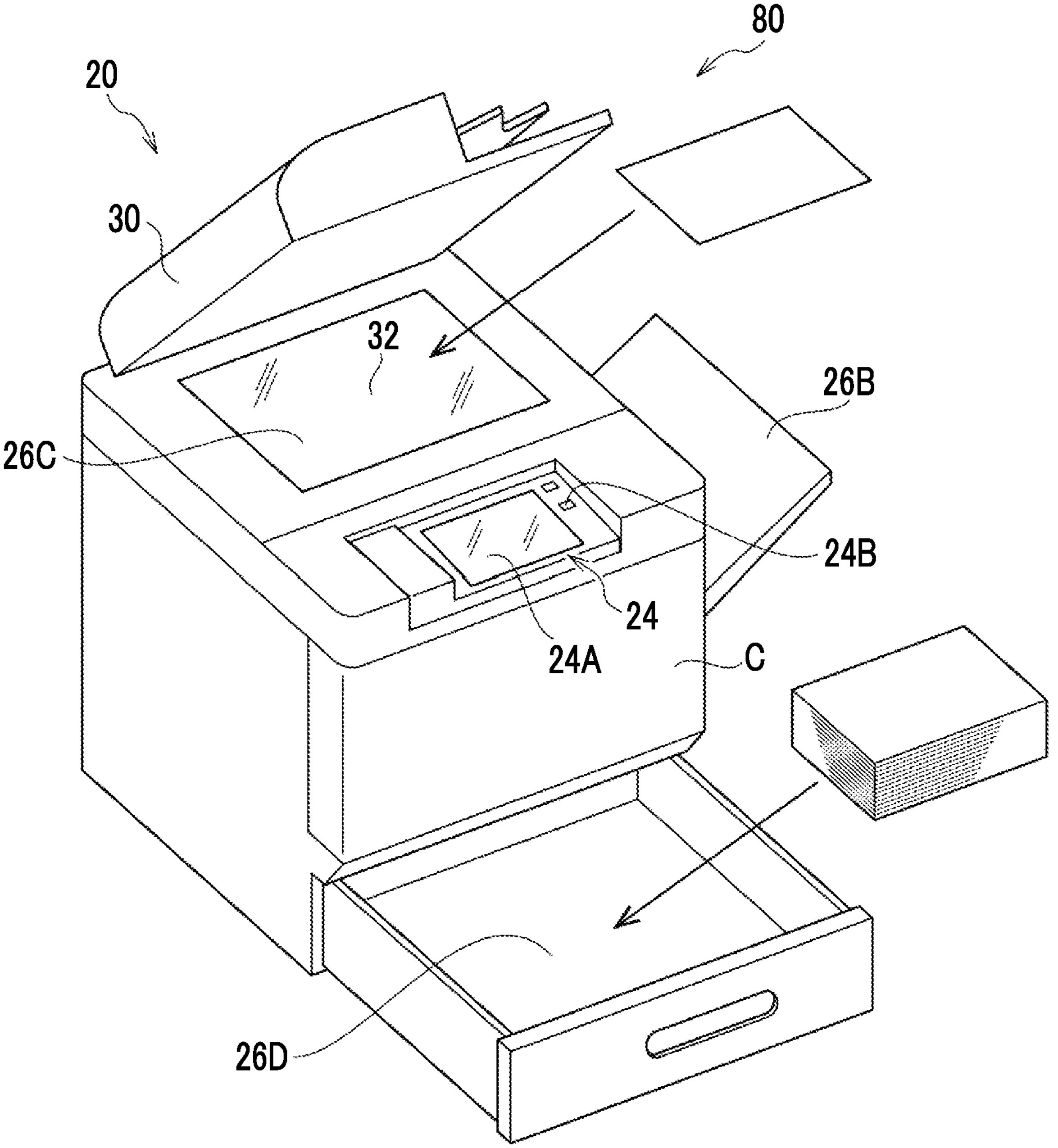
FIG. 2 is a perspective view showing an example of a configuration of an overview of the image forming apparatus in the information processing system according to the exemplary embodiment.

As shown in FIGS. 1 and 2, the image forming apparatus 20 is configured to include sheet trays 26A, 26B, 26C, and 26D. The "sheet" in the exemplary embodiment of the present disclosure includes original documents and sheets which are set on the sheet trays 26A, 26B, 26C and 26D.

The sheet tray 26A shown in FIG. 1 is a sheet tray provided in an automatic two-sided document feeding device 30 (DADF: Duplexing Auto document feeder) installed at an upper end portion of the body part 22. The automatic two-sided document feeding device 30 covers the image reading unit (platen glass) 32 to be described later, and also serves as a platen cover that is disposed to be openable and closable.

Further, the sheet tray 26A is a tray on which one or more original documents to be read by the image reading unit 32 can be set.

The sheet tray 26B is a sheet tray for manual feeding provided on a side surface of the body part 22, and a sheet for forming an original document image in the image forming unit 22A can be set on the sheet tray 26B.

The sheet tray 26C shown in FIG. 2 is a platen provided with the image reading unit 32 on an upper end surface of the body part 22. One original document to be read by the image reading unit 32 can be set on the sheet tray 26C. The sheet tray 26D is a sheet tray provided near a lower end portion of the body part 22, and a sheet for forming an original document image in the image forming unit 22A can be set on the sheet tray 26D.

The image reading unit 32 includes, for example, a charge-coupled device (CCD) image sensor or the like that reads an original document which is set on the sheet tray 26A or the sheet tray 26C of the image forming apparatus 20 and generates an original document image.

Sensor

As shown in FIG. 3, the sheet tray 26A and a sheet sensor 40A are provided. The sheet sensor 40A is a sensor capable of specifying whether or not an original document is set on the sheet tray 26A and a type of the set original document. The sheet sensor 40A senses at least a size of an original document as the type of the original document. Further, the sheet sensor 40A may be configured to be able to specify an orientation of the set original document. The sheet sensor 40A is not limited to one type of sensor, and a plurality of sensors may be used in combination.

Similarly, the sheet trays 26B, 26C, and 26D are also provided with sheet sensors 40B, 40C, and 40D, respectively. The sheet sensors 40B, 40C, and 40D are sensors that can specify whether or not sheets or original documents are set on the sheet trays 26B, 26C, and 26D, and the type of the set sheet or the set original document. The sheet sensors 40B, 40C, and 40D each sense at least a size of an original document as the type of the original document. Further, the sheet sensors 40B, 40C, and 40D each may be configured such that the orientation of the set original document can be specified. The sheet sensors 40B, 40C, and 40D each are not limited to one type of sensor, and a plurality of sensors may be used in combination.

In the present specification, the sheet sensors 40A, 40B, 40C, and 40D may be collectively referred to as a sheet sensor 40.

Control Device

The control device 10 is a device that receives a job which is input by a user's input operation to the image forming apparatus 20 and that executes a control for causing the image forming apparatus 20 to execute a designated job, and has a robotic process automation (RPA) function.

Although details will be described later, in the RPA, a recording instruction is acquired and a series of input operations performed by a user is stored. Further, the instruction of execution is acquired, and a series of stored input operations are automatically executed (automatic processing).

Electrical Configuration of Control Device

As shown in FIG. 3, the control device 10 includes a central processing unit (CPU: processor) 11, a memory 12 as a temporary storage area, a non-volatile storage unit 13, a medium reading writing device (R/W) 16, a communication interface (I/F) unit 18, and an external I/F unit 19. The CPU 11, the memory 12, the storage unit 13, the medium reading writing device 16, the communication I/F unit 18, and the external I/F unit 19 are connected to each other via the bus B1. The medium reading writing device 16 reads information written on a recording medium 17 and writes information on the recording medium 17. The communication I/F unit 18 is, for example, an interface for communicably connecting the image forming apparatus 20 to a mobile terminal 50 carried by a user or a server which is provided outside the image forming apparatus 20. For the communication I/F unit 18, for example, communication standards such as Wi-Fi (registered trademark), Bluetooth (registered trademark), and local area network (LAN) are used.

Storage Unit

The storage unit 13 is realized by a hard disk drive (HDD), a solid state drive (SSD), a flash memory, or the like. An information processing program 13A is stored in the storage unit 13 as a storage medium. The information processing program 13A is stored in the storage unit 13 in a case where the recording medium 17 in which the information processing program 13A has been written is set in the medium reading writing device 16, and the medium reading writing device 16 reads the information processing program 13A from the recording medium 17. The CPU 11 reads the information processing program 13A from the storage unit 13 and expands the information processing program 13A into the memory 12, and sequentially executes processes included in the information processing program 13A. The storage unit 13 stores a script database 13B, an input operation correspondence database 13C, and a similarity database to be described later.

Functional Configuration of Control Device

Figure 4:
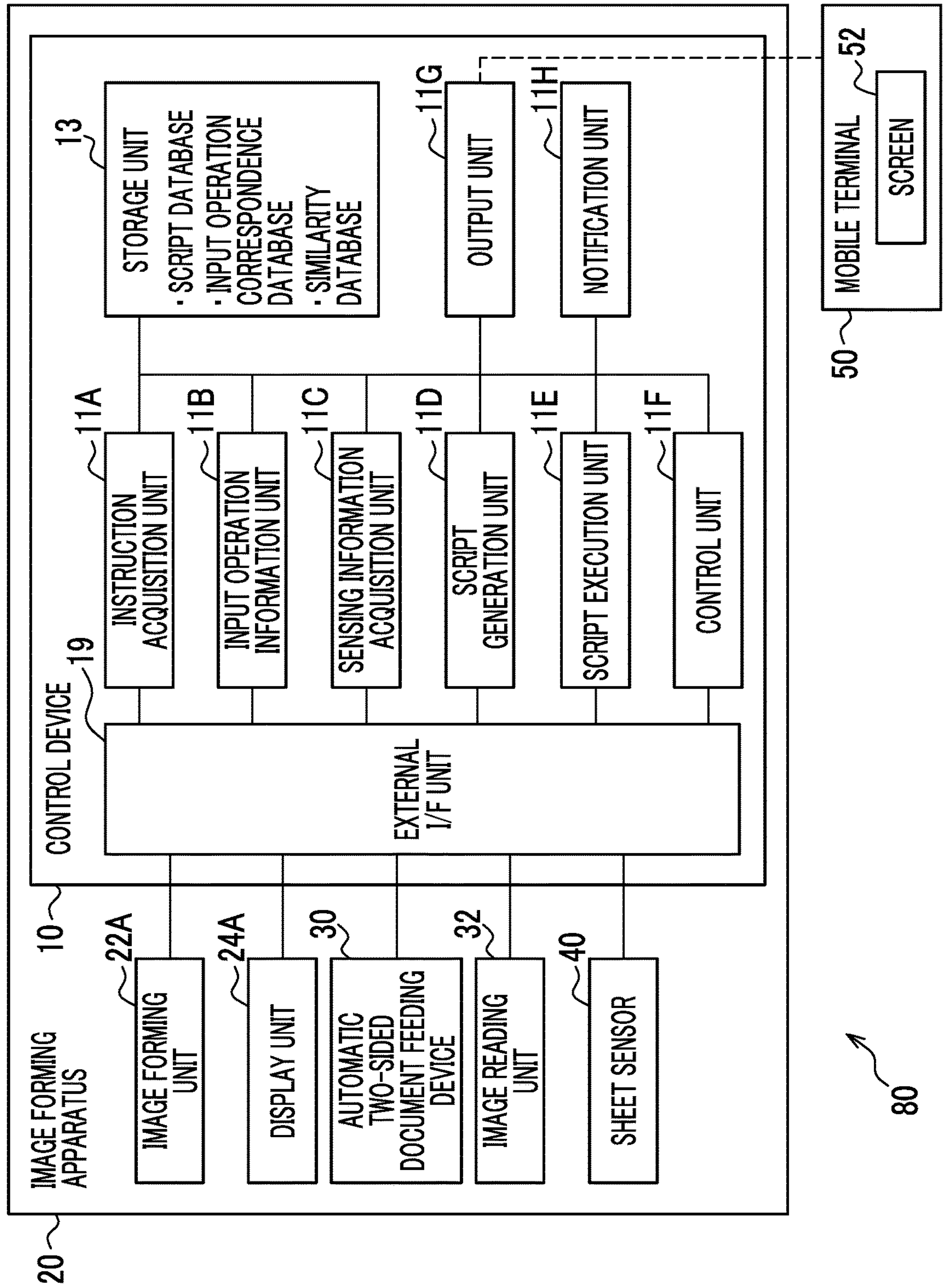
FIG. 4 is a block diagram showing an example of a functional configuration of an image forming apparatus according to the exemplary embodiment.

Next, with reference to FIG. 4, a functional configuration of the control device 10 according to the present exemplary embodiment will be described. As shown in FIG. 4, the control device 10 includes an instruction acquisition unit 11A, an input operation information acquisition unit 11B, a sensing information acquisition unit 11C, a script generation unit 11D, a script execution unit 11E, a control unit 11F, an output unit 11G, and a notification unit 11H. The CPU 11 of the control device 10 executes the information processing program 13A, thereby functioning as the instruction acquisition unit 11A, the input operation information acquisition unit 11B, the sensing information acquisition unit 11C, the script generation unit 11D, the script execution unit 11E, the control unit 11F, the output unit 11G, and the notification unit 11H.

Control Unit

The control unit 11F controls various functions of the image forming apparatus 20, such as an image forming unit 22A, a display unit 24A, an automatic two-sided document feeding device 30, an image reading unit 32, and a sheet sensor 40. The control unit 11F is able to execute various controls other than the control executed by the script execution unit 11E described later.

Instruction Acquisition Unit

The instruction acquisition unit 11A receives a job which is input by a user's input operation via the display unit 24A. For example, the instruction acquisition unit 11A acquires a "recording instruction" to record a series of sequences for automatically executing a plurality of input operations, which are performed by a user, for processing of a target to be processed. In the present specification, the "series of sequences" is referred to as a "script".

Further, the instruction acquisition unit 11A acquires an "instruction of stop" of the recording of the script. Further, the instruction acquisition unit 11A acquires an "instruction of execution" of the recorded script. In addition, the instruction acquisition unit 11A acquires an instruction to execute a specific script from among a plurality of scripts stored in the script database 13B. The script to be executed is designated by a user's input operation via the display unit 24A.

The "target to be processed" is, for example, original documents which are set on the sheet trays 26A and 26C and sheets which are set on the sheet trays 26B and 26D. The "processing of the target to be processed" is, for example, processing (hereinafter called "printing") of forming an image of an original document which is set on the sheet tray 26A or 26C on the sheet which is set on the sheet tray 26A or 26C by the image forming unit 22A.

Further, the instruction acquisition unit 11A also acquires a "continuation instruction" and a "selection instruction" which are input by a user via the display unit 24A. The continuation instruction and the selection instruction will be described later.

Input Operation Information Acquisition Unit

The input operation information acquisition unit 11B acquires information about an input operation (hereinafter, referred to as "input operation information") relating to the processing of the target to be processed by the user via the display unit 24A. The "input operation relating to the processing of the target to be processed" is defined as, for example, an input operation for issuing an instruction to initiate printing of the original document, and is defined as an input operation for designating the number of prints, black-and-white printing, full-color printing, density, print magnification, two-sided printing, reverse printing, a destination of an original document via e-mail, FAX, and the like.

Sensing Information Acquisition Unit

The sensing information acquisition unit 11C acquires sensing information from the sheet sensor 40. The "sensing information" is information about arrangement of the target to be processed, and specifically, is information for specifying whether or not the sheet or the original document is set on each of the sheet trays 26A, 26B, 26C, and 26D. Further, the sensing information acquisition unit 11C may acquire the type and orientation of the sheets or the original documents which are set on the sheet trays 26A, 26B, 26C, and 26D as "sensing information".

Script Generation Unit

The script generation unit 11D records, in the script, the input operation information, which given by the user, and the sensing information, which is obtained by the sensor that senses the information about the arrangement of the target to be processed, such that the script is executable in a chronological order. That is, the script generation unit 11D records, in the script, the input operation information, which is acquired by the input operation information acquisition unit 11B by the user inputting the information via the display unit 24A, and the sensing information, which is acquired by the sensing information acquisition unit 11C, in an order of the acquisition.

Further, the script generation unit 11D initiates recording the script in response to the instruction acquisition unit 11A acquiring the recording instruction of the script, and the script generation unit 11D stops recording the script in response to the instruction acquisition unit 11A acquiring the stop instruction of script recording.

After recording of the script is stopped, the recorded script is stored in the script database 13B of the storage unit 13. A plurality of scripts can be stored in the script database 13B. A user is able to assign an identifiable name to each script via the display unit 24A.

Script Execution Unit

The script execution unit 11E reads the script, which is stored in the script database 13B, in response to the instruction acquisition unit 11A acquiring an execution instruction of the script, and executes the designated job.

Here, the script execution unit 11E executes the next sequence in a case where the sensing information acquired by the sheet sensor 40 is the recorded sensing information during the execution of the script along the chronological order.

For example, in a case where the "input operation information", "sensing information", and "input operation information" are recorded in a script targeted by the execution instruction in a chronological order, the script execution unit 11E first executes a first sequence (that is, the input operation).

Then, in a case where the sensing information acquisition unit 11C acquires the sensing information that matches the sensing information being recorded, the script execution unit 11E executes the next sequence (input operation). On the other hand, the script execution unit 11E does not execute the next sequence until the sensing information acquisition unit 11C acquires the sensing information that matches the recorded sensing information.

For example, in a case where the situation that the original document is set on the sheet tray 26C is recorded in the script as the sensing information, the script execution unit 11E do not execute the next sequence until the sheet sensor 40C senses that the original document is set on the sheet tray 26C during execution of the script.

It should be noted that "the acquired sensing information is the recorded sensing information" and "acquiring the sensing information that matches the recorded sensing information" means that at least the sheet sizes of the acquired sensing information and the recorded sensing information coincide with each other.

Notification Unit—Notification of Notification Information Prompting Arrangement of Target to Be Processed The notification unit 11H issues a notification of the notification information prompting the arrangement of the target to be processed while the script execution unit 11E executes the script along the chronological order. Specifically, the notification unit 11H causes the display unit 24A to display a message prompting a user to arrange an original document or a sheet during execution of the script.

For example, a case where the fact that the sheet is set on the sheet tray 26C is recorded in the script as the sensing information will be described.

Figure 5A:
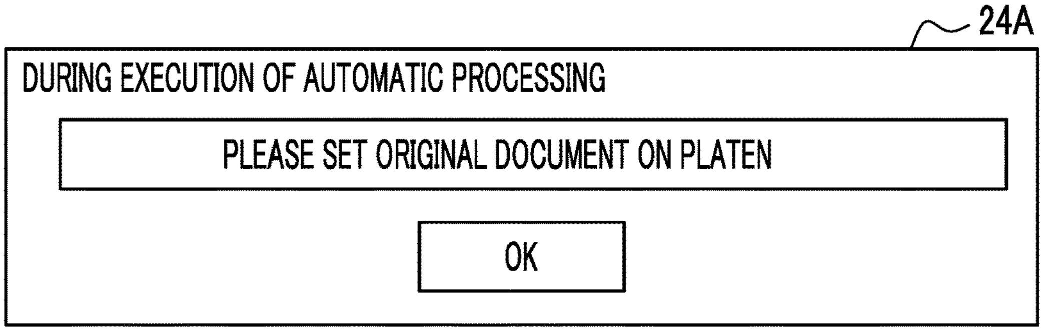
FIG. 5A is a diagram showing an example of notification information displayed on a display unit of the image forming apparatus according to the exemplary embodiment.

In such a case, while the notification unit 11H executes the script, for example, as shown in FIG. 5A, a message such as "Please set the original document on the platen" or "Please set the original document having the A4 size on the platen" is displayed as a pop-up image on the display unit 24A.

The notification of the notification information obtained by the notification unit 11H may be executed by voice instead of or in addition to the display of the text information on the display unit 24A.

Notification Unit—Notification of Notification Information Prompting Continuation Instruction of Script The notification unit 11H may issue a notification of the notification information prompting the continuation instruction of the script at the same time as the above-mentioned "notification information prompting the arrangement of the target to be processed". Specifically, as shown in FIG. 5A, for example, the notification unit 11H displays information about the "continuation instruction" such as "OK", "continuation of automatic processing", "restart of automatic processing", and "set completion", as a pop-up image, on the touch panel of the display unit 24A.

The instruction acquisition unit 11A acquires the continuation instruction which is input by the user via the display unit 24A. In addition to the sensing information acquisition unit 11C acquiring the sensing information that matches the recorded sensing information, the script execution unit 11E executes the next input operation in response to the instruction acquisition unit 11A acquiring the continuation instruction.

In addition, after the notification unit 11H issues a notification of the "notification information prompting the arrangement of the target to be processed", the script execution unit 11E may execute the next sequence in response to the case where the sheet sensor 40C senses that the original document is set on the sheet tray 26C.

That is, the notification unit 11H does not necessarily have to issue a notification of the "notification information prompting the input of the continuation instruction of the script". In such a case, the script execution unit 11E executes the next input operation even in a case where the instruction acquisition unit 11A does not acquire the continuation instruction.

Notification Unit—Notification of Confirmation Information for Selecting Whether or not to Record Script In a case where the instruction acquisition unit 11A acquires the sensing information before recording of the input operation information after acquisition of the recording instruction of the script and the acquired sensing information is different from the predetermined information, the notification unit 11H issues a notification of the confirmation information for selecting whether or not to record the acquired sensing information in the script.

The storage unit 13 stores "predetermined information". For example, the storage unit 13 stores, as the predetermined information, information that the sheet sensor 40 does not sense an original document, for example, on the sheet tray 26A or the sheet tray 26C.

In such a case, in a case where the sheet sensor 40A senses the original document on the sheet tray 26A before the instruction acquisition unit 11A records the input operation information after acquiring the recording instruction of the script, the notification unit 11H issues a notification of the confirmation information for selecting whether or not to record the sensing information of the original document on the sheet tray 26A in the script.

For example, a case where a user places an original document on the sheet tray 26A and then inputs the recording instruction of the script via the display unit 24A will be described.

Figure 5B:
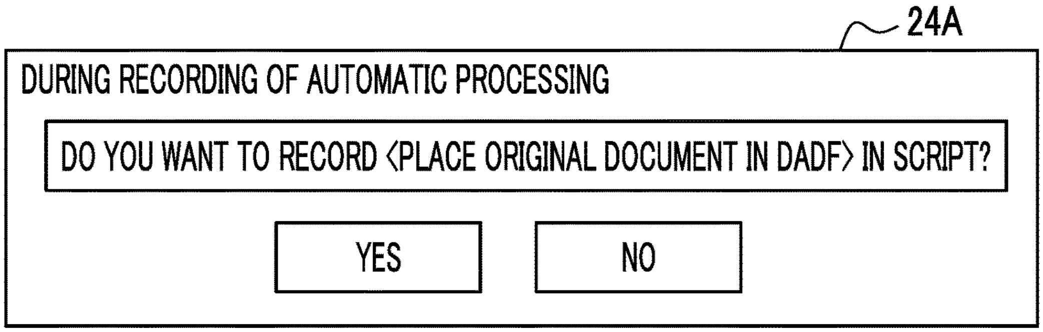
FIG. 5B is a diagram showing an example of notification information displayed on the display unit of the image forming apparatus according to the exemplary embodiment.

In such a case, the sensing information acquisition unit 11C acquires the sensing information of the original document which is set on the sheet tray 26A before recording of the input operation information. In such a case, as shown in FIG. 5B, for example, the notification unit 11H causes the display unit 24A to display, as a pop-up image, a message such as "Do you want to record <place the original document in DADF> in the script?". Further, the notification unit 11H displays, as a pop-up image, the "selection instruction" such as "yes" and "no" or "record" and "do not record" on a touch panel of the display unit 24A.

The instruction acquisition unit 11A acquires the selection instruction which is input by the user via the display unit 24A. Then, in response to the instruction acquisition unit 11A acquiring the selection instruction to "record" the sensing information, the script generation unit 11D records the sensing information. In contrast, in a case where the instruction acquisition unit 11A acquires the selection instruction to "do not record" the sensing information, the sensing information is not recorded.

Notification Unit—Notification of Confirmation Information for Selecting Whether or not Automatic Execution of Script is Necessary In a case where the sensing information is recorded before recording of the input operation information after acquisition of the recording instruction of the script, the notification unit 11H issues a notification of the confirmation information for selecting whether or not to automatically execute the next sequence after acquiring the sensing information that matches the recorded sensing information.

For example, a case where a user inputs the recording instruction of the script via the display unit 24A and then places an original document on the sheet tray 26A before the user inputs the input operation information will be described.

Figure 5C:
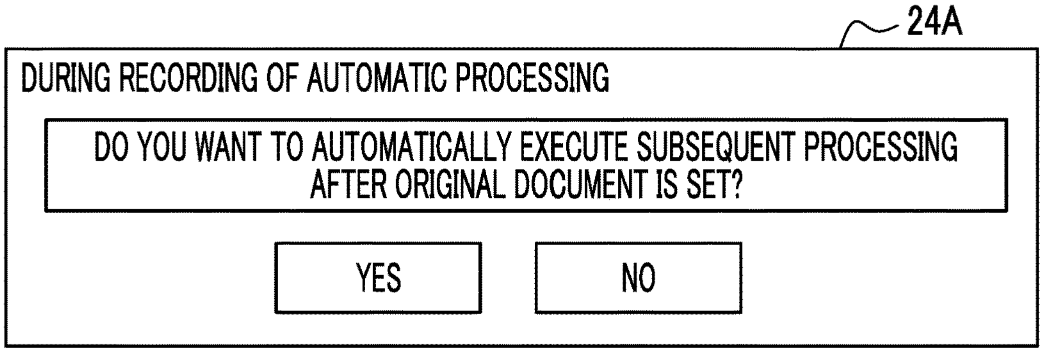
FIG. 5C is a diagram showing an example of notification information displayed on the display unit of the image forming apparatus according to the exemplary embodiment.

In such a case, the script generation unit 11D records the sensing information of the original document of the sheet tray 26A in the script. In such a case, as shown in FIG. 5C, for example, the notification unit 11H causes the display unit 24A to display, as a pop-up image, a message such as "Do you want to automatically execute the subsequent processing after the original document is set?".

Further, the notification unit 11H displays, as a pop-up image, the "selection instruction" such as "yes" and "no" or "perform automatic execution" and "do not perform automatic execution" on a touch panel of the display unit 24A.

The instruction acquisition unit 11A acquires the selection instruction which is input by the user via the display unit 24A. In a case where the instruction acquisition unit 11A acquires the selection instruction to the effect of the "automatic execution", the subsequent processing is automatically executed at the time of execution of the script.

Figure 5D:
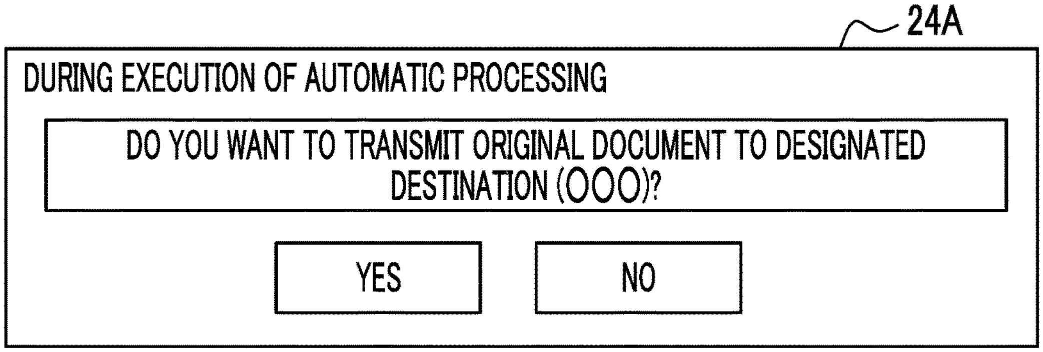
FIG. 5D is a diagram showing an example of notification information displayed on the display unit of the image forming apparatus according to the exemplary embodiment.

In contrast, in a case where the instruction acquisition unit 11A acquires the selection instruction to the effect that the sensing information is not automatically executed, the subsequent processing is not automatically executed at the time of execution of the script. In such a case, for example, as shown in FIG. 5D, the notification unit 11H displays, as a pop-up image, a message such as "Do you want to transmit the original document to a designated destination (ooo)?" on the display unit 24A during execution of the script. Further, the notification unit 11H displays, as a pop-up image, the "selection instruction" such as "yes" or "no" on the touch panel of the display unit 24A.

Other Notifications

The notification unit 11H may display the generated script on the display unit 24A before the script is stored in the script database 13B after the recording of the script is stopped. In such a case, a message prompting the user to approve the script can be displayed as the pop-up image on the touch panel of the display unit 24A. Further, the keyboard can be displayed on the touch panel such that the user is able to rewrite the script.

Output Unit-Output to Display Unit

The output unit 11G outputs the "input information" in which the input operation information is inputtable, to the touch panel of the display unit 24A of the image forming apparatus 20.

The input information includes a touch area including text information for issuing an instruction to "initiate recording" of the script, a touch area including text information for issuing an instruction to "initiate printing" of the original document, a touch area including numerical information such as a ten-key for issuing an instruction of the number of prints and the print magnification, a touch area including image information such as an icon for issuing an instruction of black-and-white printing, full-color printing, printing density, two-sided printing, reverse printing, and the like.

Output Unit-Output to Mobile Terminal

The output unit 11G may output the input information to a screen 52 of the mobile terminal 50 that is portable by a user as shown in FIG. 4 via the communication I/F unit 18. In a case where the user installs a predetermined application on the mobile terminal 50 in advance, the output unit 11G is able to display the display content, which is identical to the display content displayed on the display unit 24A, on the screen 52 of the mobile terminal 50 (so-called mirroring).

Further, the instruction acquisition unit 11A and the input operation information acquisition unit 11B is able to receive the input operation information which is input via the screen 52 of the mobile terminal 50 as the input operation information for execution.

Control Processing

Script Recording Processing

Figure 6:
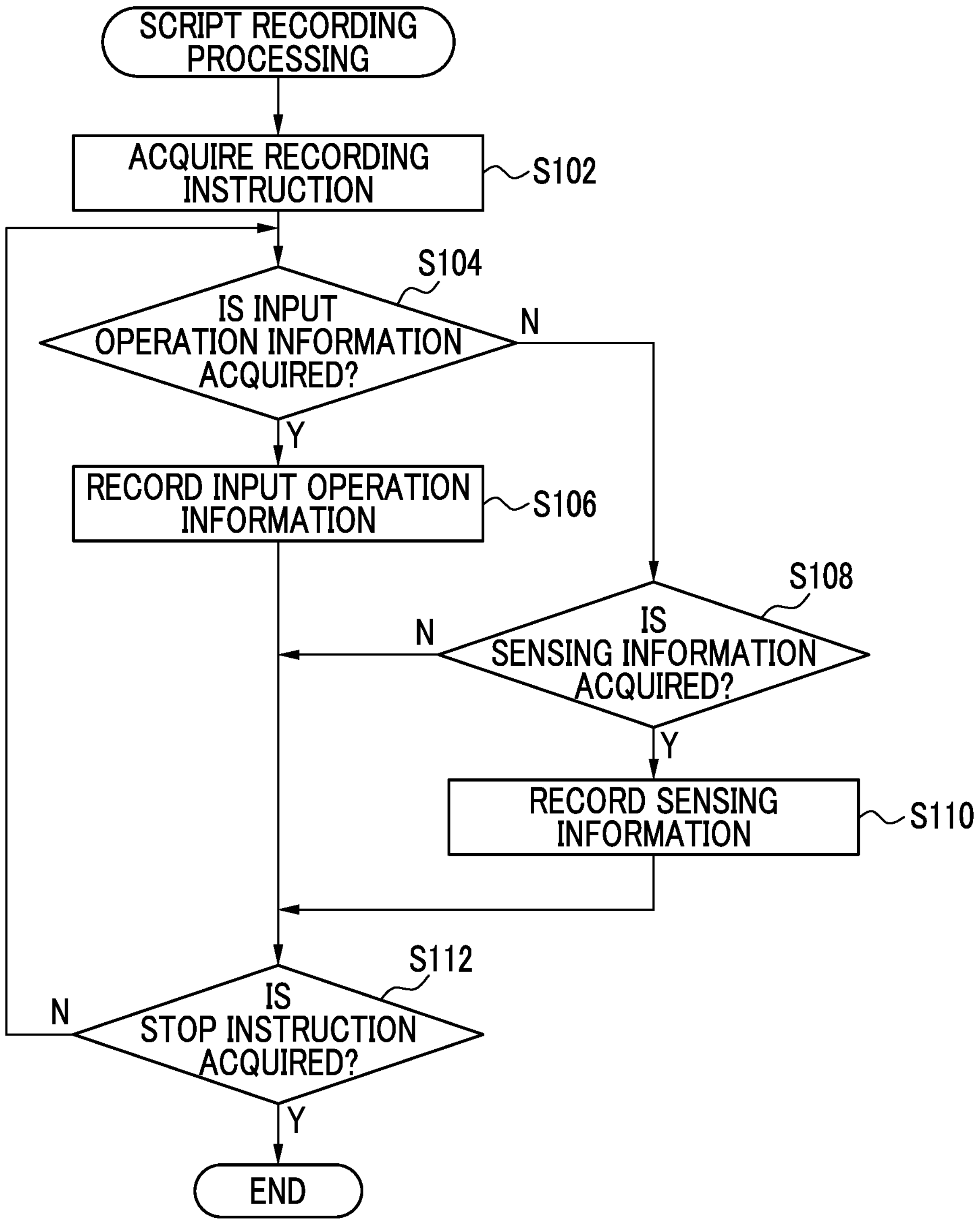
FIG. 6 is a flowchart showing an example of script recording processing according to the exemplary embodiment.

An example of the script recording processing according to the present exemplary embodiment will be described with reference to FIG. 6. In order to avoid confusion, description of various notifications issued by the notification unit 11H will be omitted in the present example.

In a case where the CPU 11 of the control device 10 acquires a script recording instruction from the user via the display unit 24A, the CPU 11 executes the information processing program 13A. Thereby, the script recording processing shown in FIG. 6 is executed (step S102).

In a case where the script recording processing is initiated, in step S104, it is determined whether or not the CPU 11 acquires the input operation information. In a case where a positive determination is made in step S104, the processing proceeds to step S106.

In step S106, the CPU 11 records the acquired input operation information in the script. Next to step S106, the processing proceeds to step S112.

In contrast, in a case where a negative determination is made in step S104, the processing proceeds to step S108. In step S108, it is determined whether or not the CPU 11 acquires the sensing information. In a case where a positive determination is made in step S108, the processing proceeds to step S110.

In step S110, the CPU 11 records the acquired sensing information in the script. Next to step S110, the processing proceeds to step S112.

In step S112, the CPU 11 determines whether or not the stop instruction of the script recording is acquired. In a case where a positive determination is made in step S112, the script recording processing is terminated. In a case where a negative determination is made in step S112, the processing returns to step S104 and the script recording processing is continued.

Script Execution Processing

Figure 7:
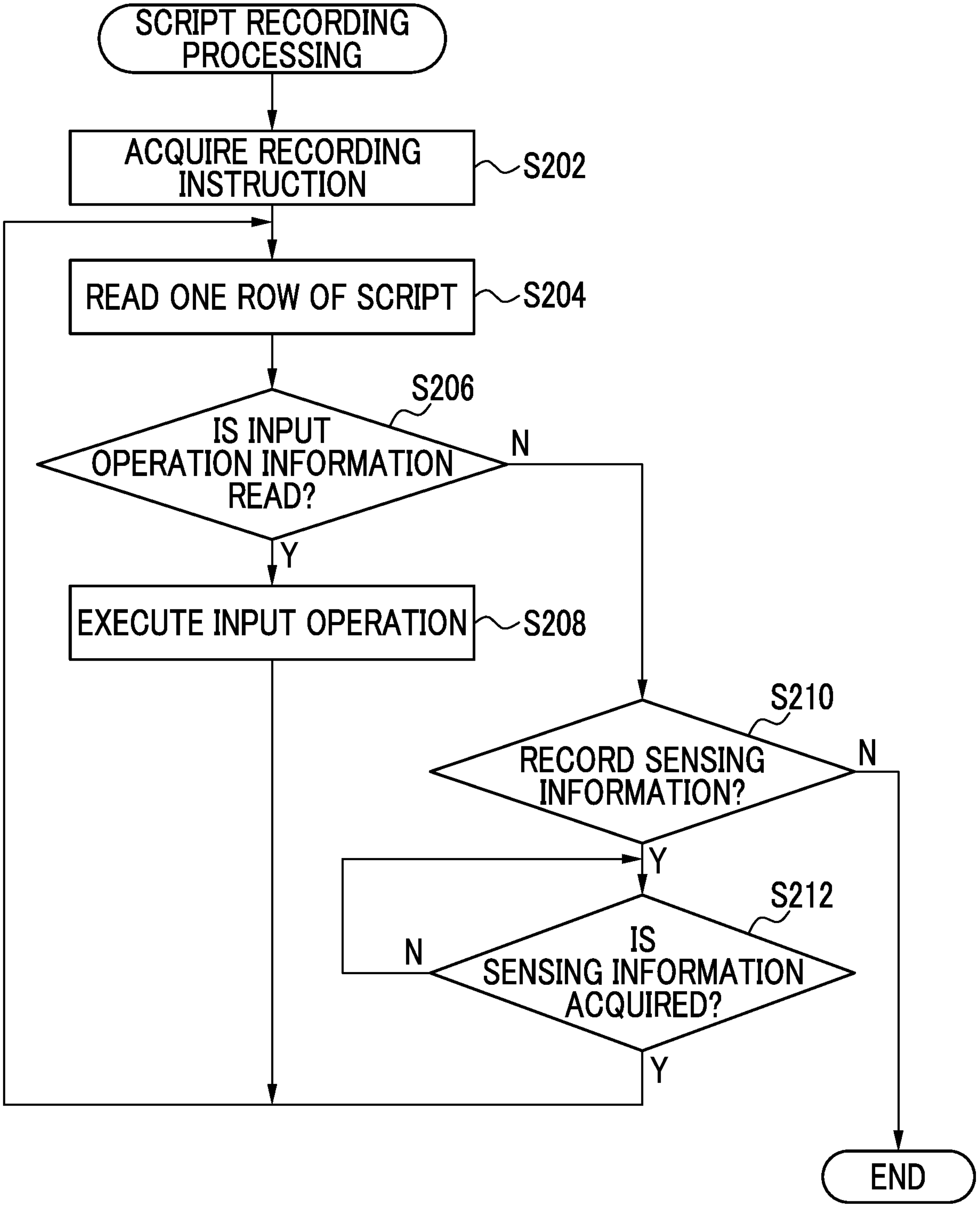
FIG. 7 is a flowchart showing an example of script execution processing according to the exemplary embodiment.

An example of the script execution processing according to the present exemplary embodiment will be described with reference to FIG. 7. In order to avoid confusion, the description of various notifications issued by the notification unit 11H will be omitted in the present example as well.

In a case where the CPU 11 of the control device 10 acquires the script execution instruction from the user via the display unit 24A, the CPU 11 executes the information processing program 13A in response to the acquisition. Thereby, the script recording processing shown in FIG. 7 is executed (step S202).

In a case where the script execution processing is initiated, in step S204, the CPU 11 reads the script subjected to the execution instruction from the script database 13B, and reads one row of the script. That is, one job is read from the script in a chronological order. Next to step S204, the processing proceeds to step S206.

In step S206, the CPU 11 determines whether or not the content described in the read row relates to the input operation information. In a case where a positive determination is made in step S206, the processing proceeds to step S208.

In step S208, the CPU executes the read input operation. Next to step S208, the processing returns to step S204 to read the next one row of the script being executed.

In contrast, in a case where a negative determination is made in step S206, the processing proceeds to step S210. In step S210, it is determined whether or not the content described in the read row relates to the sensing information. In a case where a positive determination is made in step S210, the processing proceeds to step S212.

In step S212, the CPU 11 waits for the acquisition of the identical sensing information as the recorded sensing information. The CPU 11 repeats step S212 until the sensing information which is identical to the recorded sensing information is acquired. In a case where the identical sensing information as the recorded sensing information is acquired, the processing returns to step S204, and the next one row of the executing script is read out.

In contrast, in a case where a negative determination is made in step S210, it is assumed that neither the row relating to the input operation information nor the row relating to the sensing information is described in the row which is read in the script, that is, there is no row to be read any more. Then, the CPU 11 terminates the script execution processing.

Response to Specification Change of Display Unit Correspondence Database for Input Operation The instruction acquisition unit 11A and the input operation information acquisition unit 11B acquire coordinates on the touch panel touched by a user as the input operation of the user via the display unit 24A.

As shown in FIG. 8A, in addition to the display text string displayed on the display unit 24A, the coordinates of the display text string are stored in the input operation correspondence database 13C. The "size" shown in the drawings indicates a range of a part where the text string is displayed on the touch panel. The range is a value indicating the width and height of the range in terms of the number of pixels. Further, the "upper left coordinate" indicates coordinates of the upper left corner of the range.

For example, during recording of the script, the user touches any location within a range of 66 pixels to the right and 20 pixels to the bottom from the coordinates (190.130) on the touch panel.

In such a case, the script generation unit 11D reads the input operation correspondence database 13C. Then, the script generation unit 11D records the input operation information corresponding to the range in the script database 13B together with the text information "start".

Then, at the time of execution of the script, the script execution unit 11E reads the script database 13B and executes processing associated with the coordinates described as "start" on the display unit 24A. The processing is, for example, processing of initiating printing.

Here, the specification of the display unit 24A may be changed. For example, a case where the display text string "start" is changed to "execution" due to the specification change is considered.

In such a case, at the time of execution of the script, the script execution unit 11E reads the script database 13B and attempts to execute the processing associated with the coordinates described as "start" in the display unit 24A. However, due to the specification change, the text string is not present in the display unit 24A.

Therefore, the script execution unit 11E executes an operation associated with the text information which is similar to the recorded text information.

Specifically, the script execution unit 11E refers to the similarity database 13D, and refers to a comparative text string in which the similarity with the display text string "start" which is stored in the script database is compared. Then, the script execution unit 11E determines whether or not the text string is present in the display unit 24A of which the specification is changed, in order from the text string having the highest similarity.

For example, it is determined whether or not the text string "initiation", which is most similar to "start", is displayed on the display unit 24A. In a case where this text string is not displayed on the display unit 24A, it is determined whether or not a secondarily similar text string "execution" is displayed on the display unit 24A.

In the present example, the text string "execution" is displayed on the display unit 24A due to the specification change. Therefore, the script execution unit 11E executes processing associated with the coordinates described as "execution" on the display unit 24A.

By using the similarity database 13D of the script execution unit 11E, the script may be executed even in a case where an interface of the display unit 24A for inputting the input operation information is changed.

Actions and Effects

In the information processing system 80 according to the present exemplary embodiment, the script execution unit 11E executes the next sequence in a case where the sensing information of the sheet sensor 40 matches the recorded sensing information in the script during execution of the script in chronological order. That is, in a case where the sensing information of the sheet sensor 40 does not match the recorded sensing information in the script, the next sequence is not executed.

Therefore, as compared with a case where only the input operation information given by the user is recorded as the script and the sensing information is not recorded in the script, the script is suppressed from being executed before arrangement of the sheet or the original document as the target to be processed.

Further, in the information processing system 80 according to the present exemplary embodiment, as shown in FIG. 5A, during execution of the script in chronological order, a notification of the notification information prompting the arrangement of the original document or the sheet as the target to be processed is issued. That is, in a case where the sheet sensor 40 does not sense the sensing information stored in the script, the user is able to be notified to that effect.

Thereby, delay in the arrangement operation of the original document or the sheet is suppressed as compared with the case of only waiting for the change of the sensing information obtained by the sheet sensor 40.

Further, in the information processing system 80 according to the present exemplary embodiment, in addition to matching the sensing information of the sheet sensor 40 with the recorded sensing information in the script during execution of the script in chronological order, the following operation is executed in response to acquisition of the continuation instruction of the script. An example of the continuation instruction of the script is a text string "OK" as shown in FIG. 5A.

Thereby, an input operation by the user is necessary, as compared with a case where the processing proceeds to the next sequence using only the sensing information sensed by the sheet sensor 40. Therefore, arrangement error of the sheet or the original document as the target to be processed is suppressed.

Further, in the information processing system 80 according to the present exemplary embodiment, in a case where the sensing information is acquired before recording of the input operation information after acquisition of the recording instruction of the script and the acquired sensing information is different from the predetermined information, as shown in FIG. 5B, a notification of the confirmation information for selecting whether or not to record the acquired sensing information in the script is issued.

Here, for example, one user may leave the image forming apparatus 20 with the original document placed on the sheet tray 26A or the sheet tray 26C, and another user may input an instruction to record a script via the display unit 24A while leaving the original document. In such a case, in a case where a notification of the confirmation information is not issued, unintended sensing information may be recorded.

In the present exemplary embodiment, by giving the notification of the confirmation information, it is possible to suppress recording of unintended sensing information as compared with a case where a notification of the confirmation information is not issued.

Further, in the information processing system 80 according to the present exemplary embodiment, in a case where the sensing information is recorded before the recording of the input operation information after the acquisition of the recording instruction of the script, as shown in FIG. 5C, if the sensing information matching the recorded sensing information is acquired, a notification of the confirmation information for selecting whether or not to automatically execute the next sequence is issued.

In a case where the next sequence is automatically executed, for example, printing is automatically executed in response to a user setting an original document on the sheet tray 26A (in a case where the next sequence is printing). Thereby, since the confirmation work performed by the user is not necessary, the processing speed can be improved as compared with a case where the automatic execution is not performed.

In contrast, in a case where the next sequence is not automatically executed, for example, after the user sets the original document on the sheet tray 26A, as shown in FIG. 5D, a message as to whether or not to execute the subsequent processing can be displayed at the time of execution of the script. Thereby, it is possible to suppress execution of erroneous processing as compared with the case of automatic execution.

As described above, in the present exemplary embodiment, there are many options which may be selected by the user, as compared with the case where the script is always automatically executed.

Further, in the information processing system 80 according to the present exemplary embodiment, the output unit 11G outputs the input information to the display unit 24A to the screen 52 of the mobile terminal 50 which is portable by the user. Further, the instruction acquisition unit 11A and the input operation information acquisition unit 11B receive the input operation information which is input via the screen 52 of the mobile terminal 50 as the input operation information for execution.

Thereby, the mobile terminal 50 owned by the user is able to be instructed to record and execute a series of sequences.

Other Exemplary Embodiments

In the above-mentioned exemplary embodiment, as shown in FIG. 5A, the notification unit 11H executes a notification of "notification information prompting the continuation instruction of the script", but the exemplary embodiment of the present disclosure is not limited to this. For example, the notification unit 11H does not have to issue the notification of the notification information prompting the continuation instruction of the script.

Further, in the above-mentioned exemplary embodiment, as shown in FIG. 5B, the notification unit 11H executes a notification of the "confirmation information for selecting whether or not recording of the script is necessary", but the exemplary embodiment of the present disclosure is not limited to this. For example, the notification unit 11H does not have to issue the notification of the confirmation information for selecting whether or not recording of the script is necessary.

Further, in the above-mentioned exemplary embodiment, as shown in FIG. 5C, the notification unit 11H executes a notification of the "confirmation information for selecting whether or not automatic execution of the script is necessary", but the exemplary embodiment of the present disclosure is not limited to this. For example, the notification unit 11H does not have to issue the notification of the confirmation information for selecting whether or not automatic execution of the script is necessary.

For example, in a case where the user executes the selection of recording the sensing information in response to the notification of the "confirmation information for selecting whether or not recording of the script is necessary" as shown in FIG. 5B, the notification of the "confirmation information for selecting whether or not the automatic execution of the script is necessary" as shown in FIG. 5C is not always necessary. Further, even in a case where the notification of "confirmation information for selecting whether or not to record the script is selected" as shown in FIG. 5B is not executed, the notification of the "confirmation information for selecting whether or not to automatically execute the script is selected" as shown in FIG. 5C may be executed.

As described above, various notifications issued by the notification unit 11H can be performed independently of other notifications. Further, even in a case where the notification unit 11H does not issue a notification of the various kinds of the notification information and the confirmation information, it is possible to suppress the execution of the script before the arrangement of the target to be processed.

Further, in the above-mentioned exemplary embodiment, the output unit 11G outputs the input information to the screen 52 of the mobile terminal 50 which is portable by the user, but the exemplary embodiment of the present disclosure is not limited to this. For example, the output unit 11G does not have to output the input information to the screen 52 of the mobile terminal 50 which is portable by the user.

Even in a case where the output unit 11G does not output the input information to the mobile terminal 50, it is possible to suppress the execution of the script before the arrangement of the target to be processed.

Further, in the above-mentioned exemplary embodiment, the script generation unit 11D records the input operation information together with the text information during recording of the script, and the script execution unit 11E executes an operation for associating the recorded text information with the similar text information, at the time of execution of the script. However, the exemplary embodiment of the present disclosure is not limited to this.

For example, the script generation unit 11D does not have to record the input operation information together with the text information during recording of the script. In such a case, the script execution unit 11E may execute, for example, an operation associated with the recorded coordinate information at the time of execution of the script.

Further, in the above-mentioned exemplary embodiment, for example, various processors shown below can be used as a hardware structure of the processing unit which executes each processing of the instruction acquisition unit 11A, the input operation information acquisition unit 11B, the sensing information acquisition unit 11C, the script generation unit 11D, the script execution unit 11E, the control unit 11F, the output unit 11G, and the notification unit 11H. In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed. Further, the processing unit may be composed of one processor.

As an example of configuring the processing unit with one processor, first, there is a form in which one processor is configured by a combination of one or more CPUs and software and the processor functions as the processing unit, as represented by computers such as a client and a server. Second, there is a form in which a processor that realizes the functions of the whole system including the processing unit with one integrated circuit (IC) chip is used, as represented by a system-on-chip (SoC) or the like. As described above, the processing unit is configured using one or more of the various processors as the hardware structure.

Moreover, more specifically, a circuitry combining circuit elements such as semiconductor elements can be used as the hardware structure of the various processors. As described above, the present invention can be implemented in various aspects.

Supplementary Note (((1)))

An information processing system comprising at least one processor, wherein the processor is configured to:

acquire a recording instruction to record a series of sequences for automatically executing a plurality of input operations, which are performed by a user, for processing of a target to be processed; and then record input operation information, which is given by the user to an information processing apparatus, and sensing information, which is obtained by a sensor that senses information about arrangement of the target to be processed, in the series of sequences capable of execution in a chronological order.

(((2)))

The information processing system according to (((1))), wherein the processor is configured to:

acquire an instruction of execution in the series of sequences; and then execute a next sequence in a case where sensing information of the sensor acquired during the execution in the series of sequences along the chronological order is the recorded sensing information.

(((3)))

The information processing system according to (((1))) or (((2))), wherein the processor is configured to:

issue a notification of notification information for prompting the arrangement of the target to be processed, during the execution in the series of sequences along the chronological order.

(((4)))

The information processing system according to any one of (((1))) to (((3))), wherein the processor is configured to:

during the execution in the series of sequences along the chronological order, execute a next operation in response to acquiring a continuation instruction of the series of sequences in addition to a case where acquired sensing information of the sensor is the recorded sensing information.

(((5)))

The information processing system according to any one of (((1))) to (((4))), wherein the processor is configured to:

in a case where the instruction to record the series of sequences is acquired, then the sensing information is acquired before recording of the input operation information, and the acquired sensing information is different from predetermined information, issue a notification of confirmation information for selecting whether or not to record the acquired sensing information in the series of sequences.

(((6)))

The information processing system according to (((5))), wherein the processor is configured to:

in a case where the instruction to record the series of sequences is acquired and then the sensing information is recorded before the recording of the input operation information, issue a notification of confirmation information for selecting whether or not to automatically execute the next sequence in a case where sensing information that matches the recorded sensing information is acquired.

(((7)))

The information processing system according to any one of (((1))) to (((6))), wherein the processor is configured to:

output input information, in which the input operation information is inputtable, to a screen of the information processing apparatus.

(((8)))

The information processing system according to (((7))), wherein the processor is configured to:

output the input information to a screen of a mobile terminal that is portable by the user; and receive the input operation information, which is input via the screen of the mobile terminal, as the input operation information for execution.

(((9)))

The information processing system according to any one of (((1))) to (((8))), wherein the processor is configured to:

output the input information as text information on a screen of the information processing apparatus; simultaneously record the input operation information together with the text information, during recording the series of sequences; and execute an operation associated with text information similar to the recorded text information, during execution in the series of sequences.

(((10)))

The information processing system according to any one of (((1))) to (((9))), wherein the information processing apparatus is an image forming apparatus, and the information about the arrangement of the target to be processed is information about a state of a sheet in a sheet tray.

(((11)))

An information processing program for causing a computer to execute processing comprising:

acquiring a recording instruction to record a series of sequences for automatically executing a plurality of input operations, which are performed by a user, for processing of a target to be processed; and then recording input operation information, which is given by the user, and sensing information, which is obtained by a sensor that senses information about arrangement of the target to be processed, in the series of sequences capable of execution in a chronological order.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:

at least one processor configured to:

acquire a recording instruction to record a series of sequences for automatically executing a plurality of input operations, which are performed by a user, for processing of a target to be processed; and then record in a script for automatic execution (i) input operation information, which is given by the user to an information processing apparatus, and (ii) sensing information, which is obtained by a sensor that senses information about arrangement of the target to be processed, in the series of sequences for execution in a chronological order in which the input operation information and the sensing information are obtained, wherein the information processing apparatus is an image forming apparatus, and the information about the arrangement of the target to be processed is information about a state of a sheet in a sheet tray.

2. The information processing system according to claim 1, wherein the at least one processor is configured to:

acquire an instruction of execution in the series of sequences; and then execute a next sequence in a case where sensing information of the sensor acquired during the execution in the series of sequences along the chronological order is the recorded sensing information.

3. The information processing system according to claim 2, wherein the at least one processor is configured to:

issue a notification of notification information for prompting the arrangement of the target to be processed, during the execution in the series of sequences along the chronological order.

4. The information processing system according to claim 2, wherein the at least one processor is configured to:

during the execution in the series of sequences along the chronological order, execute a next operation in response to acquiring a continuation instruction of the series of sequences in addition to a case where acquired sensing information of the sensor is the recorded sensing information.

5. The information processing system according to claim 2, wherein the at least one processor is configured to:

in a case where the instruction to record the series of sequences is acquired, then the sensing information is acquired before recording of the input operation information, and the acquired sensing information is different from predetermined information, issue a notification of confirmation information for selecting whether or not to record the acquired sensing information in the series of sequences.

6. The information processing system according to claim 5, wherein the at least one processor is configured to:

in a case where the instruction to record the series of sequences is acquired and then the sensing information is recorded before the recording of the input operation information, issue a notification of confirmation information for selecting whether or not to automatically execute the next sequence in a case where sensing information that matches the recorded sensing information is acquired.

7. The information processing system according to claim 1, wherein the at least one processor is configured to:

output input information, in which the input operation information is inputtable, to a screen of the information processing apparatus.

8. The information processing system according to claim 7, wherein the at least one processor is configured to:

output the input information to a screen of a mobile terminal that is portable by the user; and receive the input operation information, which is input via the screen of the mobile terminal, as the input operation information for execution.

9. The information processing system according to claim 1, wherein the at least one processor is configured to:

output the input information as text information on a screen of the information processing apparatus; simultaneously record the input operation information together with the text information, during recording the series of sequences; and execute an operation associated with text information similar to the recorded text information, during execution in the series of sequences.

10. A non-transitory computer readable medium storing an information processing program for causing a computer to execute processing comprising:

acquiring a recording instruction to record a series of sequences for automatically executing a plurality of input operations, which are performed by a user, for processing of a target to be processed; and then recording in a script for automatic execution (i) input operation information, which is given by the user to an information processing apparatus, and (ii) sensing information, which is obtained by a sensor that senses information about arrangement of the target to be processed, in the series of sequences for execution in a chronological order in which the input operation information and the sensing information are obtained, wherein the information processing apparatus is an image forming apparatus, and the information about the arrangement of the target to be processed is information about a state of a sheet in a sheet tray.

11. An information processing method comprising:

acquiring a recording instruction to record a series of sequences for automatically executing a plurality of input operations, which are performed by a user, for processing of a target to be processed; and then recording in a script for automatic execution (i) input operation information, which is given by the user to an information processing apparatus, and (ii) sensing information, which is obtained by a sensor that senses information about arrangement of the target to be processed, in the series of sequences for execution in a chronological order in which the input operation information and the sensing information are obtained, wherein the information processing apparatus is an image forming apparatus, and the information about the arrangement of the target to be processed is information about a state of a sheet in a sheet tray.

* * * * *